United States Patent
Wöstmann et al.

(10) Patent No.: US 11,845,124 B2
(45) Date of Patent: Dec. 19, 2023

(54) ROLLER CASTING METHOD AND SYSTEM FOR PRODUCING A SPIRAL STRUCTURE

(71) Applicant: Fraunhofer-Gesellschaft zur Förderung der angewandten Forschung e.V., Munich (DE)

(72) Inventors: Franz-Josef Wöstmann, Bremen (DE); Michael Heuser, Bremen (DE); Matthias Busse, Bremen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/277,925

(22) PCT Filed: Sep. 19, 2019

(86) PCT No.: PCT/EP2019/075157
§ 371 (c)(1),
(2) Date: Mar. 19, 2021

(87) PCT Pub. No.: WO2020/058395
PCT Pub. Date: Mar. 26, 2020

(65) Prior Publication Data
US 2021/0354193 A1      Nov. 18, 2021

(30) Foreign Application Priority Data
Sep. 19, 2018   (DE) .................... 10 2018 215 974.2

(51) Int. Cl.
*B22D 11/06*      (2006.01)
*B22D 31/00*     (2006.01)
*H02K 15/12*     (2006.01)

(52) U.S. Cl.
CPC ...... *B22D 11/0622* (2013.01); *B22D 11/0651* (2013.01); *B22D 11/0697* (2013.01); *B22D 31/002* (2013.01); *H02K 15/12* (2013.01)

(58) Field of Classification Search
CPC . B22D 11/06; B22D 11/0622; B22D 11/0651; B22D 11/0697; B22D 31/00;
(Continued)

(56) References Cited

U.S. PATENT DOCUMENTS 1,690,887 A      11/1928 Davis
3,104,937 A *   9/1963 Wyckoff et al. ....... D01D 5/088
                                                          264/DIG. 73
(Continued)

FOREIGN PATENT DOCUMENTS

| EP | 2387135 | A2 | 11/2011 |
| EP | 2819276 | A2 | 12/2014 |
| JP | 58-126112 | A | 7/1983 |

OTHER PUBLICATIONS

International Search Report and Written Opinion received for PCT Patent Application No. PCT/EP2019/075157, dated Oct. 16, 2019, 20 pages. (9 pages of English Translation and 11 pages of Original Document).

*Primary Examiner* — Kevin P Kerns
(74) *Attorney, Agent, or Firm* — Faegre Drinker Biddle & Reath LLP

(57) ABSTRACT

A roller casting method produces a spiral structure, in particular a spiral structure for use in electric machines. Molten metal is supplied between a first roller and a second roller miming opposite thereto, wherein the first roller has first teeth, and the second roller has second teeth, said first and/or second teeth having tooth flanks with cavities for receiving the supplied molten metal. The teeth are designed and aligned such that the cavity of at least one tooth is at least temporarily delimited by the surface of a tooth of the
(Continued)

other roller when the rollers are rotating such that the supplied molten metal is molded between the teeth while cooling and is molded into a section of the spiral structure.

17 Claims, 10 Drawing Sheets

(58) Field of Classification Search
CPC ... B22D 31/002; H02K 15/0471; H02K 15/12
USPC .......................................... 164/418, 428, 480
See application file for complete search history.

(56) References Cited

U.S. PATENT DOCUMENTS

| | | | | |
|---|---|---|---|---|
| 3,574,809 | A * | 4/1971 | Fairbanks et al. ...... | B29C 59/04 264/209.3 |
| 3,963,813 | A * | 6/1976 | Keith ........................ | B32B 3/28 264/165 |
| 4,153,664 | A * | 5/1979 | Sabee ....................... | D04H 1/00 264/282 |
| 4,211,743 | A * | 7/1980 | Nauta et al. .......... | B29C 59/022 425/363 |
| 4,499,040 | A | 2/1985 | Maemoto et al. | |
| 5,188,265 | A * | 2/1993 | Capy ..................... | B29C 53/285 28/279 |
| 5,443,379 | A * | 8/1995 | Hsu et al. .............. | A21C 11/24 425/336 |
| 5,679,479 | A * | 10/1997 | Young et al. ....... | H01M 50/406 429/247 |
| 6,846,172 | B2 * | 1/2005 | Vaughn et al. .......... | B31F 1/07 101/6 |

* cited by examiner

ROLLER CASTING METHOD AND SYSTEM FOR PRODUCING A SPIRAL STRUCTURE

CROSS REFERENCE TO RELATED APPLICATIONS

The present application is a national stage application of International Application No. PCT/EP2019/075157, filed Sep. 19, 2019, which claims priority to German Application No. DE102018215974.2, filed Sep. 19, 2018, the disclosures of which are hereby incorporated by reference in their entireties.

FIELD OF THE DISCLOSURE

The present application relates to a roller casting method for producing a spiral structure.

BACKGROUND OF THE DISCLOSURE

Wound coils are used in electric machines. The coils do not ideally fill the available installation space. This results in a lower power or torque density of the electric machines in relation to the weight or the installation space. A better filling degree is achieved by the use of cast, formed or printed coils of variable cross-section, and the above-mentioned disadvantages are improved.

The shaping of these coils is difficult on account of the complex three-dimensional geometry, and, until now, was performed primarily in permanent molds or lost molds with or without cores. These are generally discontinuous methods which are technically complex with regard to the tools in which the coils are produced.

A typical geometry of the coil is shown in FIG. 1. This coil is described in detail in EP Patent Application Publication No. 2 387 135 A2.

SUMMARY

The object of the invention is to produce spiral structures in an industrially applicable process, i.e. quickly, economically and in high numbers, which process may be used to produce spirals for use in electric machines. This object is achieved by the subject matter of the claims.

The claims relate, amongst other things, to a roller casting method for producing a spiral structure, in particular a spiral structure for use in electric machines, wherein a melt is supplied between a first roller and a second roller running opposite thereto, wherein the first roller has first teeth, and the second roller has second teeth, said first and/or second teeth having tooth flanks with cavities for receiving the supplied melt, wherein the teeth are designed and aligned such that the cavity of at least one tooth is at least temporarily delimited by a surface of a tooth of the other roller when the rollers are rotating such that the supplied melt is shaped between the teeth as it cools into a portion, for example a pitch portion, of the spiral structure.

The term "roller casting" is a new term and denotes the shaping of structures by rolling over gearwheel-like elements provided with cavities, wherein a melt is shaped as it cools in the cavities. This method may be used both for individual and endless structures.

The term "portion of the spiral structure" is understood to mean any portion of the spiral structure created by cooled and shaped melt.

The term "pitch portion" is understood to mean at least a portion of the spiral structure that has a twist and/or a height offset in the direction of the central axis of the resultant spiral structure or the later spiral. This may be, for example in the case of a rectangular spiral structure (finished spiral, see FIG. 1), an arrangement with twisted legs of a turn (see FIGS. 3a and 3b or 4a through 4m). A later spiral is then produced by twisting legs of a turn again relative to one another and then compressing them, for example in accordance with FIG. 5.

BRIEF DESCRIPTION OF THE DRAWINGS

The invention will be explained on the basis of a number of drawings. In the drawings.

DETAILED DESCRIPTION OF THE DRAWINGS

Figure 1:
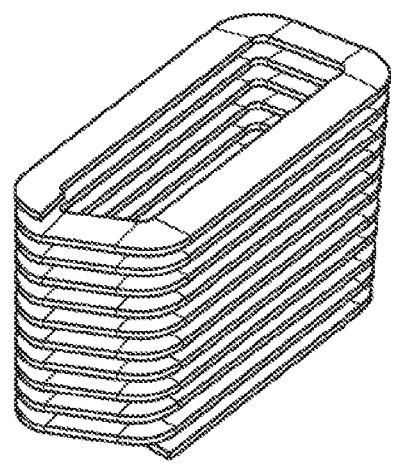
FIG. 1 shows a typical coil geometry.
Figure 2:
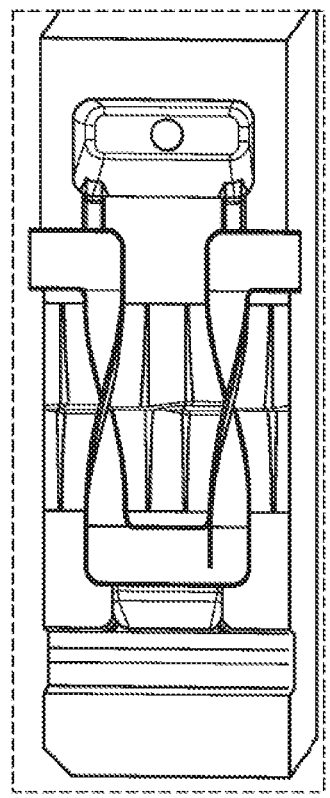
FIG. 2 shows a tool geometry for a casting process.

With this invention, the coil or a coil semi-finished product or preliminary product is shaped directly from the melt, with a thixotropic material or with a preliminary material in the form of a wire between two continuously rotating rollers.

In order to realize a continuous production process with short cycle times, the tool geometry, as described in parallel patent applications in the name of the applicant, is developed on two rollers. The rollers run in opposite directions to one another so that they form a molding cavity at each point of contact or over their contact line. Due to the continuous rotation of both rollers, a fully formed coil is thus produced as mold cavity in the contact line with continuous rotation.

The contours of the rollers are coordinated with one another here such that melt may enter the forming mold cavity from above and is transported along by the continuous rotary movement. The temperature of the rollers and melt, as well as the cooling of the rollers is set such that the melt, during the continuous rotation, hardens at the latest when the cavity opens downwardly again.

In the continuous process, one or more formed coils is thus produced with each revolution of the roller pair.

Depending on the coil geometry, one or more coils is/are positioned over the circumference of the rollers. Here, it is advantageous to keep the roller diameter as large as possible in order to reduce the curvature. If the circumference of the rollers is greater than the length of the formed coil, two or more coils are thus positioned around the rollers. This is achieved in such a way that, following a complete revolution of both rollers, the first cavity geometry is effective again.

Furthermore, a plurality of roller pairs may be arranged directly adjacently to increase productivity.

Figure 3A:
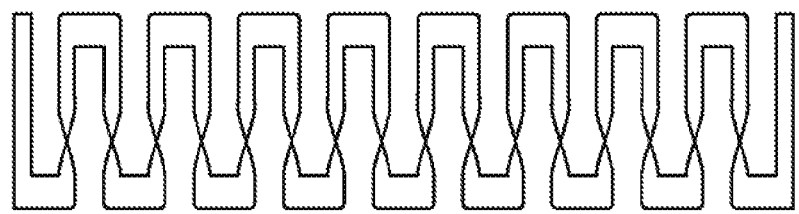
FIGS. 3a and 3b show a plan view and side view, respectively, of a wound spiral structure.
Figure 3B:

To produce this geometry, in the roller casting method or roller molding method (with regard to the roller molding method see also the patent application filed on the same date in the name of the same applicant and entitled "Roller molding method for producing a spiral structure . . . ", the content of which is hereby fully incorporated in the present patent application) a geometry or a spiral structure is first produced and is pulled apart in the z height direction and rotated in each turn through 90 degrees. With regard to the angle, an alternately larger and smaller angle is also possible. This creates the formed geometry.

a) The two rollers with the produced contour similarly to a gearwheel rotate in opposite directions. In so doing they close and open the contours of the mold cavity between the rollers in a continuous process due to the rolling of the rollers against one another, and the coil material is introduced between the rollers, brought into the desired geometry in the mold cavity, and on the opposite side exits from between the rollers again similarly to FIGS. 3a and 3b. The cavities may be different from turn to turn or also "from tooth to tooth" so as to allow variable cross-sections of the resultant turns.

b) The orientation of the rollers and the resultant arrangement of the axes in space are free in principle.

c) The spiral structure shown in FIGS. 3a and 3b (as a plan view and a side view, respectively) may be shaped into a rectangular spiral by twisting individual legs and/or by compression in the direction of the central later spiral axis.

Example: Supply of the material from above:

Utilizing the force of gravity, liquid melt, thixotropic material or solid material is supplied from above.

In the case of liquid material, either the supply amount should be metered such that the supplied melt amount matches the amount discharged through the mold cavity between the rollers or should be slightly greater. If a slightly greater amount is used, excess material runs out/down over the sides of the rolls and is caught. It is advantageous of the melt is supplied under inert gas.

Alternatively to the precisely metered melt amount, a melt reservoir may be arranged above the rollers, which is delimited downwardly by the rollers and at the sides by a temperature-resistant wall.

The rotation speed of the rollers is set here such that the formed coil geometry exits in the solid state on the lower side. To assist the cooling or heat dissipation, the rollers may be temperature-controlled. Furthermore, with this arrangement, a bath with water for quenching, an oxidizing liquid for quenching and passivating or insulating the surface, or a melt bath with a low-melting metal or plastic for direct coating may be arranged below the roller pair.

When thixotropic or solid material is supplied, the material is supplied from above as semi-finished product with the aid of a supply means, for example similarly to the wire supply in an inert-gas welding apparatus. To preheat the material, a voltage is applied between the end of the supply means and the rollers. Here, current intensity and residence time between supply means and rollers determine the temperature of the preliminary material resulting from the electrical resistance.

The material may also be supplied from the side or from below. Particularly in the event of supply from the bottom up, the melt may be applied by means of low pressure by gas, similarly to the conventional low-pressure die casting or by melt chambers corresponding to one another.

FIGS. 4a through 4l show exemplary embodiments of the spiral structures to be cast. In the interest of better comprehension or simplified presentation, only one roller with a spiral structure forming thereon has been shown in each of FIGS. 4a through 4i. The counter roller is not shown. Equally, the shown spiral structure (which appears to be of meandering form in the plan view) is shown in its fully cast end state, as it is shaped by the shaping of the two oppositely rotating rollers in the cavity between the tooth flanks and the corresponding cavity of the rollers rotating in opposite directions. It should also be highlighted that the entire finished spiral structure is shown, i.e. for reasons of improved clarity, the liquid state of the melt is not shown here (see FIG. 4m in this regard). In FIGS. 4a through 4i it can be seen how a structure according to FIGS. 3a and 3b, albeit wound on the circumference of a roller, is created.

Figure 4A:
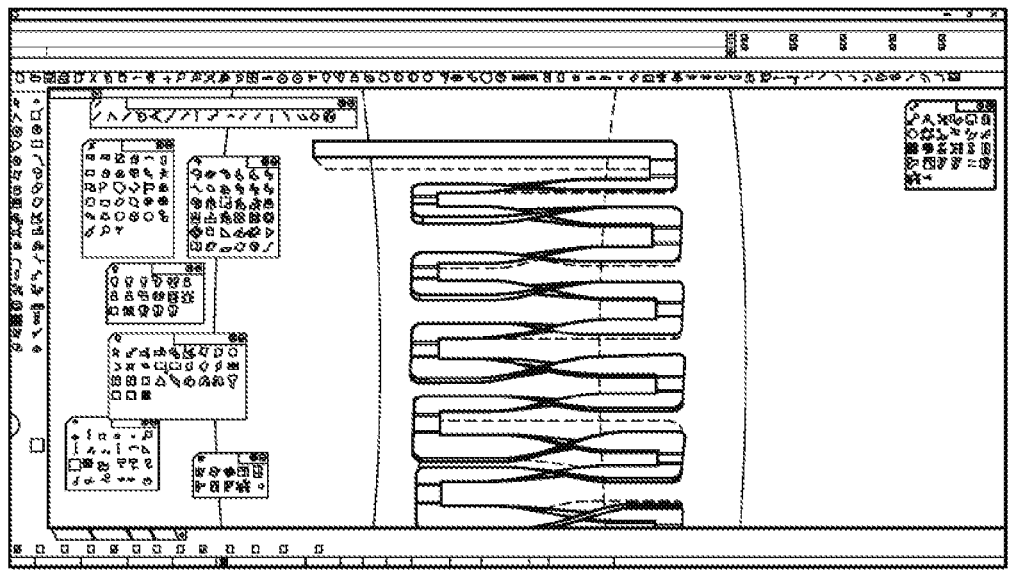
FIGS. 4a through 4m show rollers with spiral structures lying therein and also details of a roller casting system.
Figure 4B:
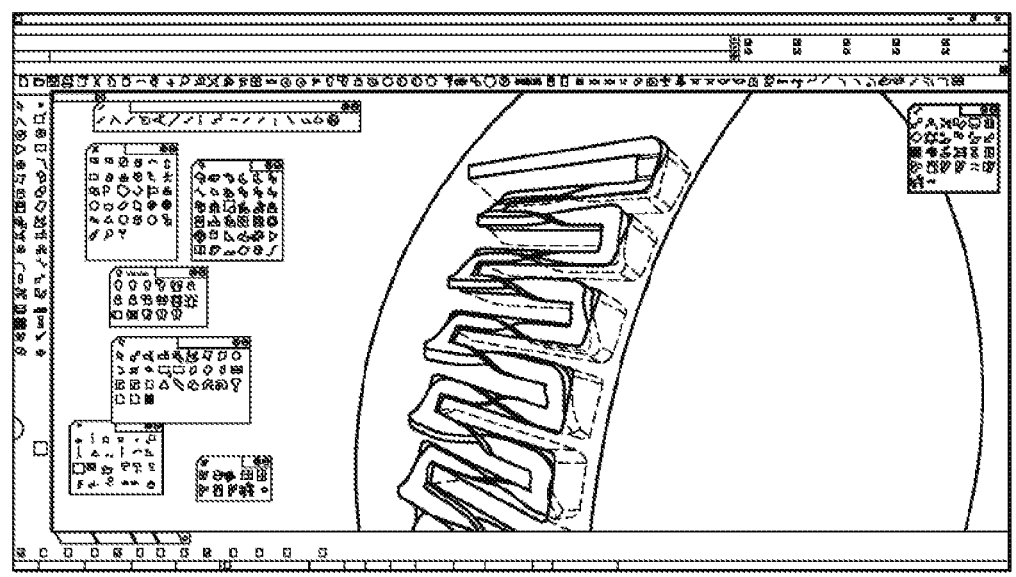
Figure 4C:
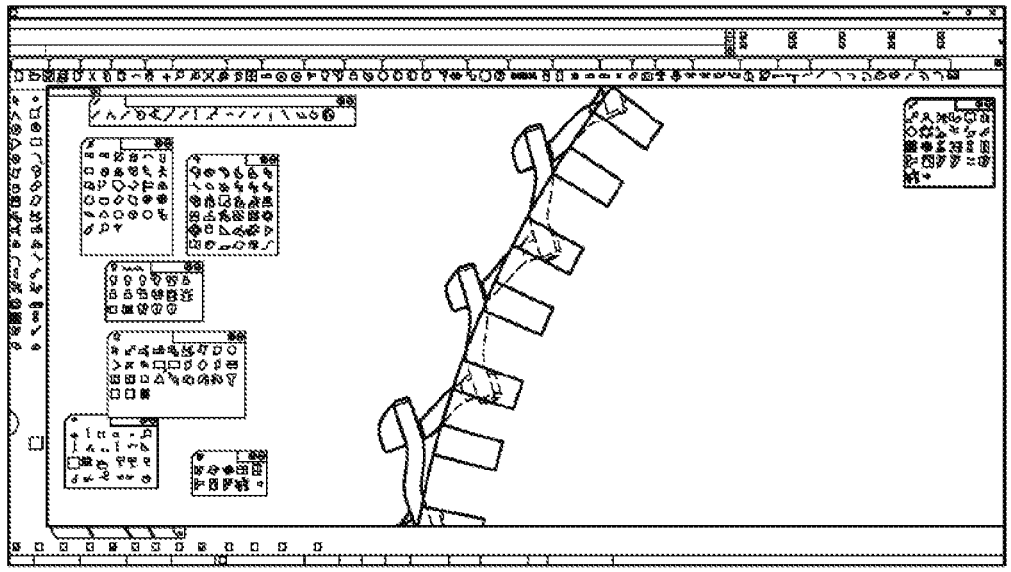
Figure 4D:
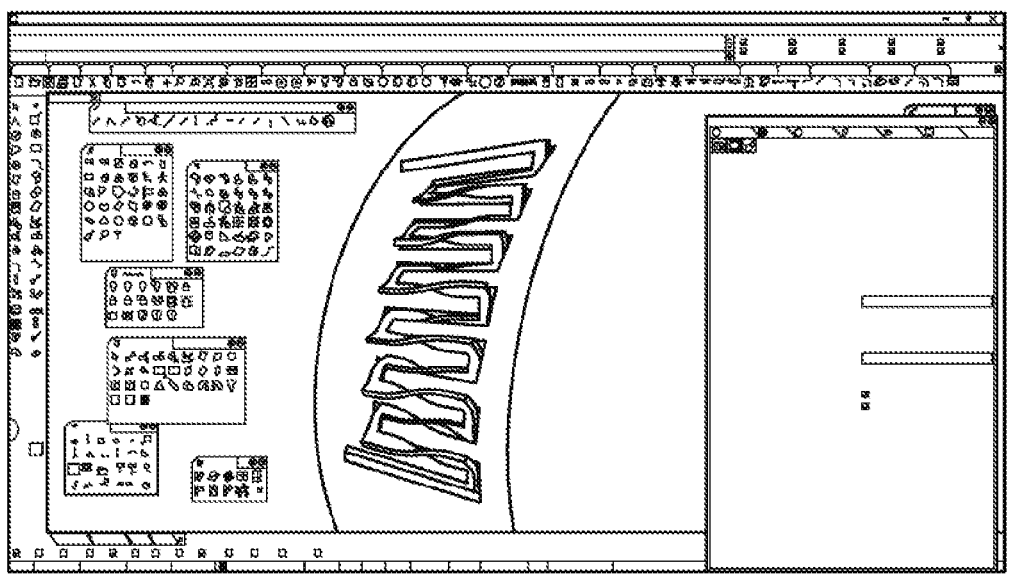
Figure 4E:
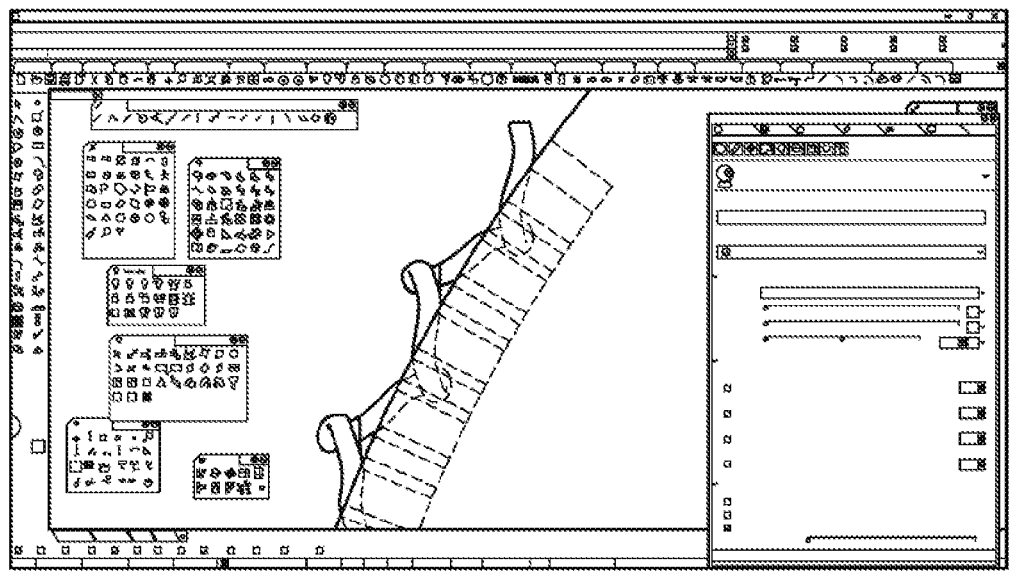
Figure 4F:
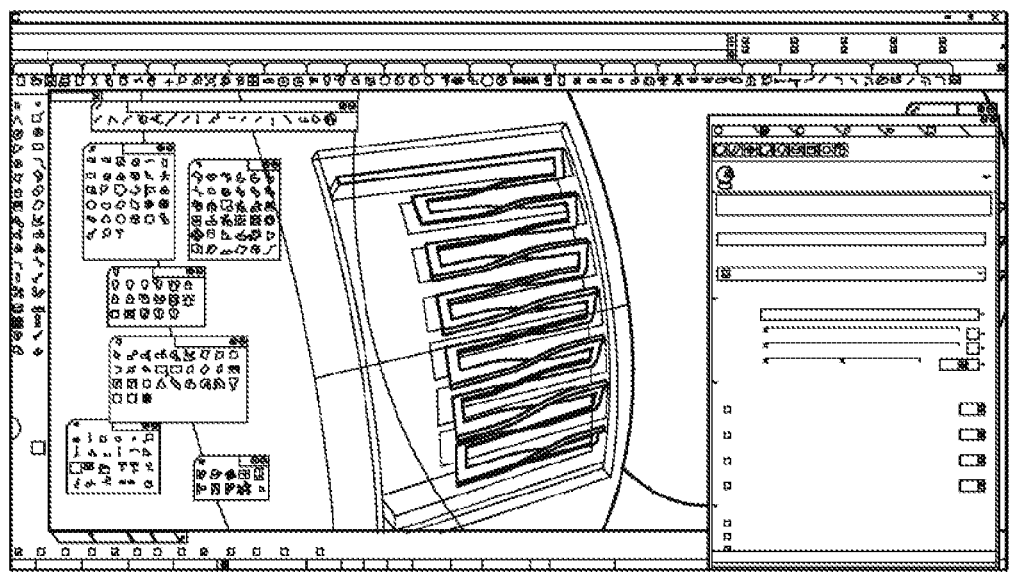
Figure 4G:
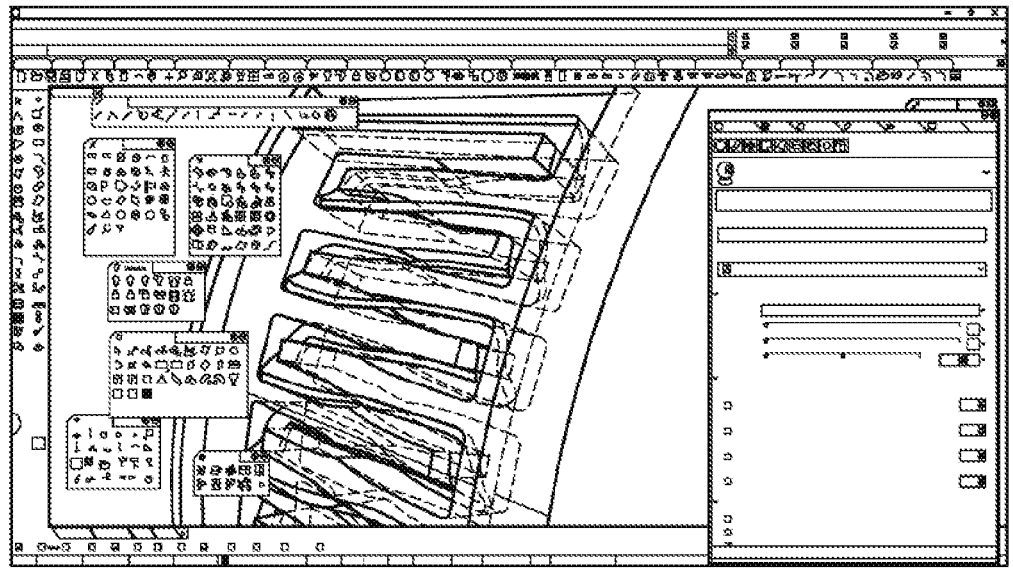
Figure 4H:
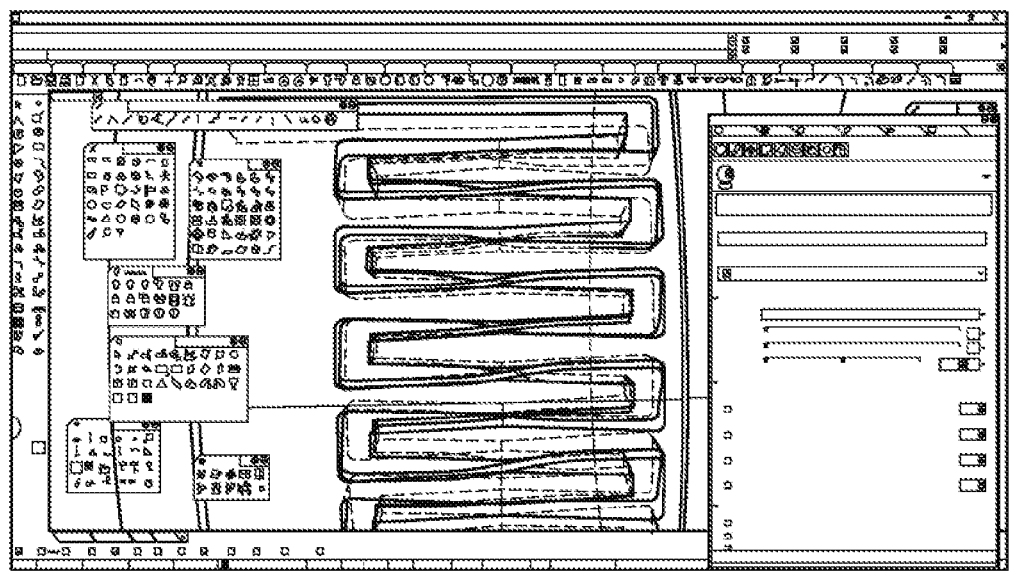
Figure 4I:
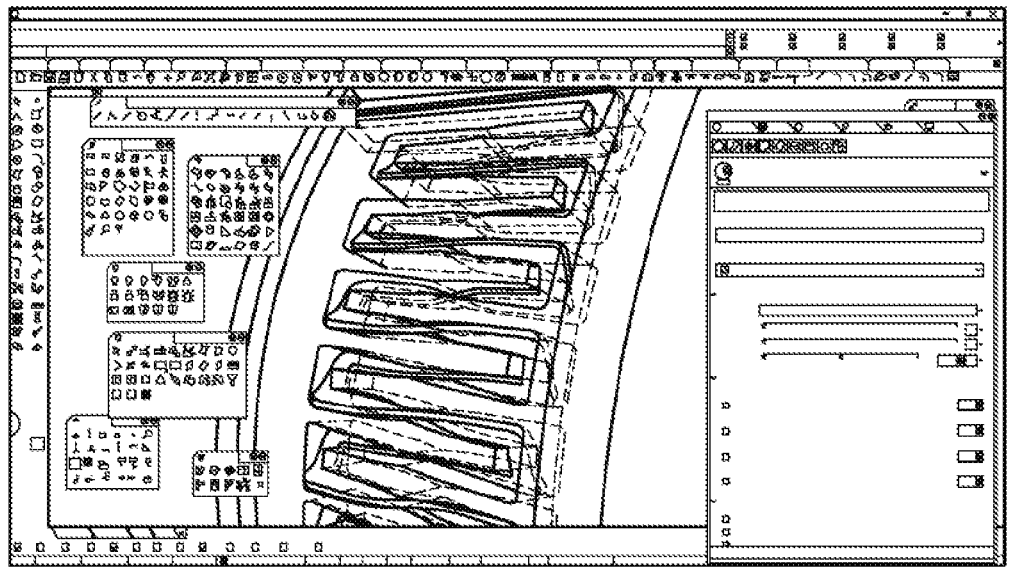
Figure 4J:
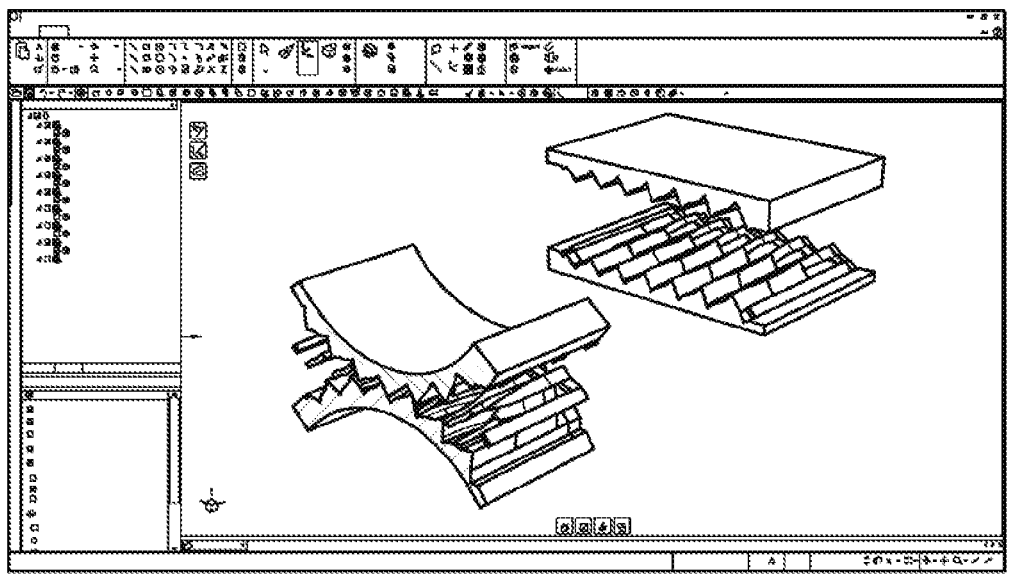
Figure 4K:
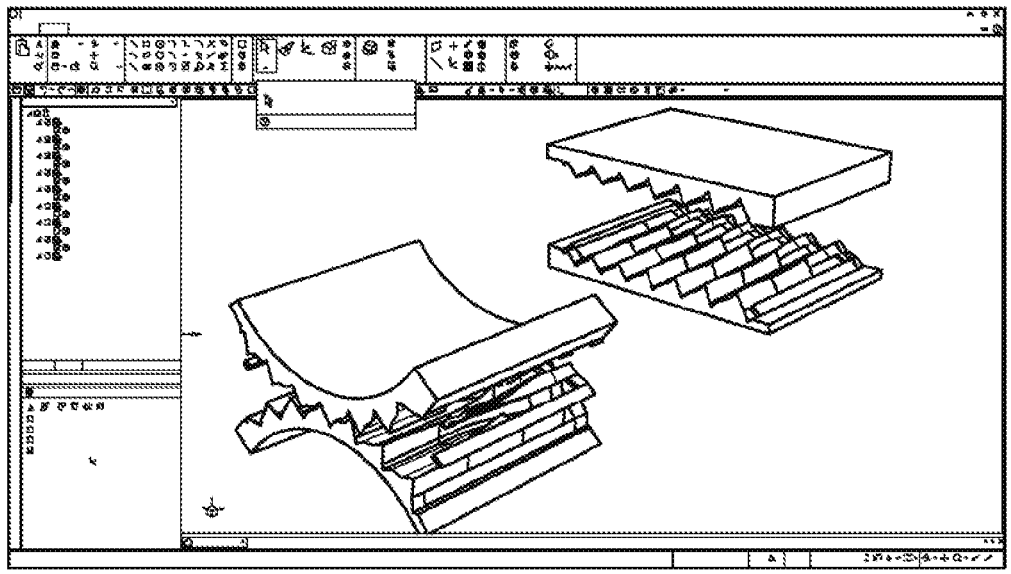
Figure 4L:
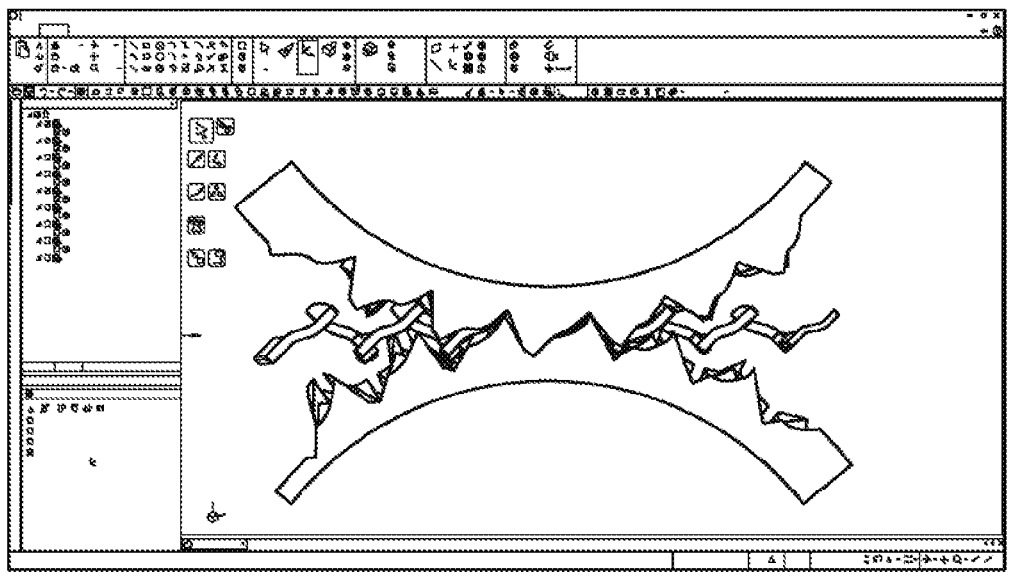

In addition, FIGS. 4j, 4k and 4l show arrangements in which the two rollers rolling against one another are shown. Shown there is a roller casting method for producing the spiral structure, in particular for use in electric machines, wherein a melt (shown here) is guided between a first roller and a second roller running opposite thereto (in FIG. 4k or 4l an upper and a lower roller are shown in each case), wherein the first roller has first teeth (for example the upper roller in FIG. 4l), and the second roller has second teeth (lower roller in FIG. 4l), said first and/or second teeth having tooth flanks with cavities for receiving supplied melt, wherein the teeth are designed and oriented such that the cavity of at least one tooth is at least temporarily delimited by the surface of a tooth of the other roller when the rollers are rotating such that the supplied melt is molded between the teeth as it cools into a portion of the spiral structure. Here, the spiral structure shown in FIG. 4a through FIG. 4k is created.

Figure 4M:
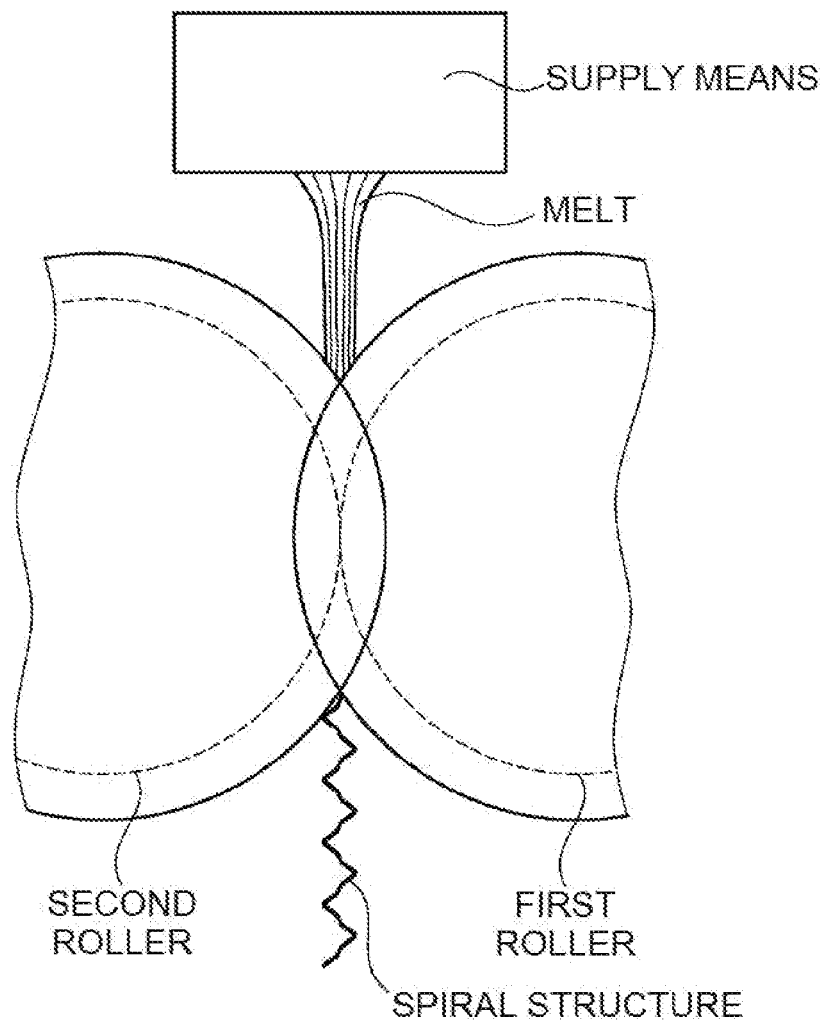
Figure 5:
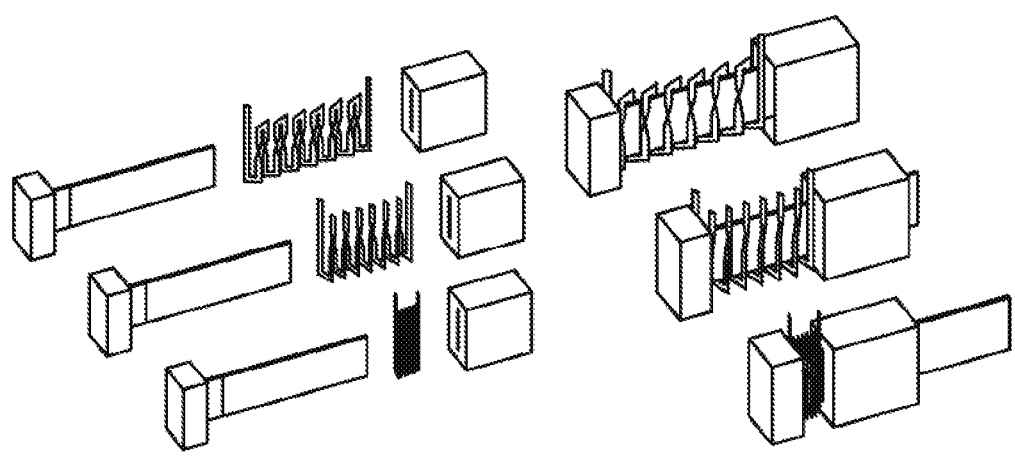
FIG. 5 shows compression of a spiral structure in the direction of the central spiral axis.

FIG. 4m schematically shows a supply means above a roller arrangement (formed by first roller and second roller), wherein the first roller has first teeth and the second roller has second teeth, said first and/or second teeth having tooth flanks with cavities for receiving supplied melt. The supplied melt is fed via the supply means shown above the rollers, and a spiral structure (see also FIGS. 3a and 3b) is formed by the guidance of the melt into cavities of the tooth flanks of the opposing rollers and then may be processed further into a spiral, for example a rectangular spiral, by compression in the direction of the later central spiral axis.

c) In principle, all electrically conductive materials may be considered for use, in particular aluminum, copper and their alloys, all metallic materials, but also hybrid materials such as electrically conductive plastic composites.

d) By spraying a suitable release agent onto the rotating rollers in the region of the shaping cavity, the demolding of the stretched coil as it exits from the rolling region may be simplified, on the one hand. On the other hand, the release agent may have, for example, an oxidizing effect on the surface of the coil turns, which intensifies the electrical insulation of the turns from one another (anodizing effect) and at the same time may have a supporting effect for the subsequent coating for insulation of the coil.

e) A coating may be applied in order to electrically insulate the coil. This coating may be performed by a downstream roller pair with identical contour, into which the stretched coil is drawn once more. The insulation material is first introduced continuously into the cavities in this second roller pair, such that, as the stretched coil passes through, the insulation material is applied to the turns, possibly at elevated temperature, similarly to a roll cladding process. This may occur alternatively to the known coil coating processes.

f) Depending on the material to be processed, the rollers may consist of tool steel, or, in the case that plastics are to be processed or other soft or low-temperature materials, may consist of aluminum, ceramic or combinations thereof. Furthermore, the shaping contour may be embodied as a replaceable insert, such that, in the event that wear is sustained, the insert may simply be replaced, or the same basic rollers may be used for different geometries and materials.

g) Following the production of the wound geometry, this is supplied to process steps, such as deburring, polishing, cleaning, grinding, coating. In this case the geometry has proven to be advantageous due to the improved accessibility on account of the pre-formed coil. For necessary handling of the semi-finished product, positioning, fixing and handling aids, etc. may be provided in the roller contour in the rolling process and may be removed or used for further processing as required. The second key advantage of this geometry variant is the simple shaping process after the casting by insertion of a guide rod into the center of the winding and direct shaping of the windings against one another. This is achieved by threading the coil onto a mandrel having a shoulder, as shown in FIG. 5. With the aid of this design, the coil is deformed or brought back into the assembled state. The shaping process and calibration may be combined here. For explanation: The guide rod is thin at the start (to simplify the threading, and becomes thicker towards the pressure-applying contact face and corresponds to the interior of the turn). Ideally, the end contour of the interior has at least the same height as the overall coil to be achieved. (See FIG. 5)

h) The contour-giving geometry of the rollers may be formed as an insert which may be easily replaced on account of wear, damage, geometry change, etc. Here, the insert may be manufactured from steel, aluminum, other metallic materials, ceramic or plastic, depending on the material to be processed. Conventional methods may be used for the production of the inserts. The insert may also be manufactured as a blank in a stretched/planar layer and then shaped on the circumference of the roller body as an insert support. In the case of ceramic inserts or plastic inserts, a master contour may be produced in a planar geometry, shaped to the necessary radian measure, and then used in a rapid prototyping method, for example in vacuum casting for the production of the inserts. Here, the necessary deformation of the contour is advantageously achieved directly by the shaping for friction-free meshing. In this approach, plastic or wax molded products may be also be produced, which are cast by precision casting to achieve metallic inserts.

The advantage of the invention lies in the reduction of the manufacturing outlay, and an economical alternative, suitable for series manufacture, to previously known shaping methods for electrical coils is provided.

During the shaping, in each case the legs of the later spiral that run in parallel are shaped, that is to say the two longitudinal sides or the two end sides (angle head sides). Should these opposite sides or legs not be exactly parallel, this is compensated by corresponding angular adjustments, such that an angle sum of 180 degrees is achieved. Due to the combination of shaped winding head and less than or equal to 90 degrees rotation, or, in alternation, a larger and a smaller rotation of the turn, the following advantages are achieved:

Continuous production process with extremely high yield.

Due to the combined and variable adjustment of the modification of the winding head and with simultaneous rotation of the coil less than or equal to 90 degrees, the tool concept may be used for any type of slip-in coil.

No draw bevels at relevant points at the turns are necessary (possible to provide parallel-flanked and non-parallel-flanked turns), and thus there is no reduction of the slot fill factor resulting from the manufacturing process A pre-formed coil may be shaped by simply being pushed together with the aid of a mandrel in the assembled state (thus, there is no need for a complex process)

The mandrel geometry may be such that a calibration into the end geometry is implemented with the shaping. (A thin threading region becomes thicker over the mandrel length towards the force-applying shoulder as far as the end geometry of the coil interior. The end contour of the coil interior should ideally have at least the same length as the coil geometry to be achieved.)

Process steps are suitable for automation (important for large-scale production)

By use of contour-giving inserts, the changeover times are far apart, and the tool costs and investment costs are low.

Easily scalable by the use of a plurality of roller pairs arranged adjacently.

Method/manufacturing variant may be transferred to other geometries, for example profiled wires.

Due to the invention it is possible to produce coils using materials such as Al and Cu or Al and Cu alloys from the molten thixotropic or solid state on a mass scale and therefore to significantly increase the productivity, design freedom and economic viability in series production. Furthermore, with the described approach, other materials to be processed by casting may be brought into a helical geometry.

Furthermore, different helices with different numbers of turns, turn thicknesses and turn widths in an outer form may be produced; design variants are made possible. With the present invention, a significant contribution to the economical production of helices, for example for use as a coil in electric machines, is achieved, and new manufacturing methods for electric machines with higher power density and greater efficiency as compared to the prior art are provided. By using the innovative concept to produce the coils or models for coils or lost molds for coils of geometrically easily shaped tools, robust and automatable manufacturing processes for large-scale production are made possible.

The invention claimed is:

1. A roller casting method for producing a spiral structure, the roller casting method comprising:
supplying a melt between a first roller and a second roller running opposite thereto;
wherein the first roller has first teeth, and the second roller has second teeth, at least one of the first teeth and second teeth having tooth flanks with cavities for receiving the melt; and
wherein the first teeth and second teeth are oriented such that the cavity of at least one tooth of one of the first teeth and the second teeth is at least temporarily delimited by the surface of a tooth of the other of the first teeth and the second teeth when the first roller and the second roller are rotating such that the melt is molded between the first teeth and the second teeth as it cools into a portion of the spiral structure, the spiral structure having a longitudinal axis, and the spiral structure rectangularly surrounding the longitudinal axis.

2. The roller casting method according to claim 1, wherein the melt is supplied under an inert gas atmosphere.

3. The roller casting method according to claim 1, wherein an amount of the melt is metered such that it one of (A)

matches a mold cavity available in the cavity; and (B) is slightly greater than the mold cavity.

4. The roller casting method according to claim 1, wherein the melt comprises at least one of (A) at least one metal, and (B) at least one plastic.

5. The roller casting method according to claim 4, wherein the at least one metal comprises one of iron, aluminum, copper, and alloys thereof.

6. The roller casting method according to claim 1, wherein a shaping contour in the first roller and the second roller is provided by tool inserts, with an insert for each part to be produced.

7. The roller casting method according to claim 6, wherein the tool inserts for the shaping contour comprise at least one of steel, aluminum, metallic alloys, and ceramics.

8. The roller casting method according to claim 6, wherein the tool inserts are produced directly from a planar tool insert contour by shaping to a radius of the first roller and the second roller.

9. The roller casting method according to claim 1, further comprising, prior to supplying the melt between the first roller and the second roller, supplying materials in a liquid, thixotropic or solid state, wherein, if the materials are supplied in the solid state, a preheating device is used to adjust a temperature and a viscosity of the material, for forming the melt.

10. The roller casting method according to claim 9, wherein the preheating device applies a voltage between a rolling system, comprising the first roller and the second roller, and a supply system.

11. A roller casting system for producing a spiral structure, the roller casting system comprising:
at least a first roller with first teeth and a second roller, running opposite thereto, with second teeth;
wherein at least one of the first teeth and the second teeth have tooth flanks with cavities for receiving a supplied melt; and
wherein the first teeth and the second teeth are oriented such that the cavity of at least one tooth of one of the first teeth and the second teeth is at least temporarily delimited by the surface of a tooth of the other of the first teeth and the second teeth when the first roller and the second roller are rotating in order to mold the supplied melt into a portion of the spiral structure, the spiral structure having a longitudinal axis, and the spiral structure rectangularly surrounding the longitudinal axis.

12. The roller casting system according to claim 11, further comprising a melt reservoir upstream of the first roller and the second roller for providing the supplied melt.

13. The roller casting system according to claim 11, further comprising, downstream of the first roller and the second roller, at least one of a water bath for quenching and a liquid supply system for supplying liquid for at least one of passivating, insulating, and coating the spiral structure.

14. A roller casting method for producing a spiral structure, the roller casting method comprising:
supplying a melt between a first roller and a second roller running opposite thereto;
wherein the first roller has first teeth, and the second roller has second teeth, at least one of the first teeth and second teeth having tooth flanks with cavities for receiving the melt; and
wherein the first teeth and second teeth are oriented such that the cavity of at least one tooth of one of the first teeth and the second teeth is at least temporarily delimited by the surface of a tooth of the other of the first teeth and the second teeth when the first roller and the second roller are rotating such that the melt is molded between the first teeth and the second teeth as it cools into a portion of the spiral structure, the spiral structure comprising a longitudinal axis and a plurality of turns, each of the plurality of turns comprising a first leg, a second leg, a third leg, and a fourth leg together surrounding the longitudinal axis.

15. The roller casting method according to claim 14, wherein the first leg, the second leg, the third leg, and the fourth leg together provide each of the plurality of turns with a rectangular shape.

16. The roller casting method according to claim 14, wherein the first leg and the third leg are disposed on opposite sides of the longitudinal axis, and the second leg and the fourth leg are disposed on opposite sides of the longitudinal axis.

17. A roller casting system for producing a spiral structure, the roller casting system comprising:
at least a first roller with first teeth and a second roller, running opposite thereto, with second teeth;
wherein at least one of the first teeth and the second teeth have tooth flanks with cavities for receiving a supplied melt; and
wherein the first teeth and the second teeth are oriented such that the cavity of at least one tooth of one of the first teeth and the second teeth is at least temporarily delimited by the surface of a tooth of the other of the first teeth and the second teeth when the first roller and the second roller are rotating in order to mold the supplied melt into a portion of the spiral structure, the spiral structure comprising a longitudinal axis and a plurality of turns, each of the plurality of turns comprising a first leg, a second leg, a third leg, and a fourth leg together surrounding the longitudinal axis.

* * * * *